United States Patent [19]

Yabuta et al.

[11] 3,925,252

[45] Dec. 9, 1975

[54] CATALYZER APPARATUS AND METHOD FOR THE PRODUCTION THEREOF

[75] Inventors: Tozo Yabuta, Okazaki; Yasuhisa Kaneko; Akiyoshi Morita, both of Toyota, all of Japan

[73] Assignee: Toyota Jidosha Kogyo Kabushiki Kaisha, Japan

[22] Filed: Nov. 3, 1972

[21] Appl. No.: 303,373

[30] Foreign Application Priority Data

Nov. 5, 1971  Japan............................ 46-88085

[52] U.S. Cl.......... 252/447; 252/477 R; 23/288 FC; 423/213.2; 423/213.5
[51] Int. Cl.²..................... B01J 21/18; B01J 35/00
[58] Field of Search...... 252/477 R, 447; 423/213.2, 423/213.5, 213.7; 23/288 F, 288 FC

[56] References Cited

UNITED STATES PATENTS

| | | | |
|---|---|---|---|
| 2,975,144 | 3/1961 | Gross et al. | 252/477 R |
| 3,362,783 | 1/1968 | Leak | 252/477 R |
| 3,701,823 | 10/1972 | Hardison | 423/213.2 |

*Primary Examiner*—W. J. Shine
*Attorney, Agent, or Firm*—Stevens, Davis, Miller & Mosher

[57] ABSTRACT

A catalyzer apparatus for holding particles of a catalyzers and method for the production thereof, adapted for exhaust gas purification in an internal combustion engine. The catalyzer particles are piled upon a netty structure such as wire net and then wound into a block in the form of a roll.

21 Claims, 17 Drawing Figures

FIG. 7-iii

CATALYZER APPARATUS AND METHOD FOR THE PRODUCTION THEREOF

BACKGROUND OF THE INVENTION

Contained in the exhaust gas discharged from internal combustion engines are harmful substances such as, for example, carbon monoxide (CO), unburned hydrocarbons (HC, hereinafter) and nitrogen oxides (NO).

These harmful substances, if exhausted into the air, cause problems of air pollution. Accordingly, increasing public demand is being directed to the removal of such substances insofar as possible from the exhaust gases.

For this purpose various methods and systems have been proposed. For example, manifold reactors, after burners, E.G.R.s (Exhaust Gas Recyclers) and catalytic converters are available, and many attempts have been made to develop "air pollution free" cars by providing the cars with these devices alone or combined in a system.

Of the above-mentioned methods and systems, the catalytic converter is known as one of the most advantageous systems for purifying exhaust gas. The capacity of this type of converter substantially depends upon the activity of the catalyzer incorporated therein.

To briefly explain, the catalyzer has the function of facilitating an oxidizing or reducing reaction, or other chemical reactions which destroy harmful substances, through a surface contacting reaction with said substances, while the catalyzer itself is, in principle, not chemically changed by such reactions. But, the catalyzer may inevitably tend to degrade by aging because it is exposed to elevated temperatures or subjected thermal stresses caused by chemical reactions, or it receives fine particles of lead oxide and other substances which may coat its surface.

For the production of catalyzers intended for huge industrial consumption, materials such as alumina and various types of ceramics are prevalently employed as catalyzer carriers. For the same purpose, alternatively a type of ceramic is kneaded together with an active catalytic substance and sintered into a block. When employed as a carrier, a ceramic has little weight and many superior characteristics. The light weight of the ceramic contributes to the efficient warm-up time of the catalyzer, which is one of the important roles the catalyzer carrier plays, especially, when used in purifying the exhaust gases of internal combustion engines. Nevertheless, ceramics have a weakness in their mechanical strength.

If the mechanical strength is not sufficient, the catalyzer placed in the catalytic converter is likely to break down due to vibrations or the exhaust gas pressure which the converter may receive during operation of the internal combustion engine and the vehicle in which it is mounted.

In addition, the catalyzer may be degraded in the following ways by various external forces. Breakage by impact forces that may be caused when the individual catalyzers collide with one another due to vibrations, or collisions against the inner walls of the converter. Breakage by compression may be caused when the catalyzers press one another or are pressed against the inner walls of the converter and wear may be caused when the catalyzers rub against one another.

As an effective deterrent against these degradations by external forces, a catalytic carrier of the monolithic type comes to mind. But a carrier of this type has disadvantages in that its production involves a complicated process and high cost. On the other hand, granular catalyzer carriers of the conventional type in the form of spheres, bars, or cylinders, can be produced with such ease and low cost that they are too advantageous to abandon.

BRIEF SUMMARY OF THE INVENTION

A primary objective of this invention is to provide a catalyzer apparatus and method for the production thereof for holding particles of a catalyzer of the conventional type, especially a catalyzer which is somewhat fragile. According to the present invention, particles of the catalyzer can be protected against various external forces so that their degradation may be minimized. The catalyzer thus held can suitably be adapted for purifying the exhaust gas from internal combustion engines such as automotive vehicle engines. In a preferred embodiment of the present invention, a roll of a netty (net or mesh-like) metal sheet or screen, has piled thereon particles of the catalyzer which will be described later herein. Other objectives and advantages of the invention will be apparent from the following description.

BRIEF DESCRIPTION OF THE DRAWINGS

FIGS. 6-i and 6-ii show preferred netty structures used in the invention;

FIGS. 7-i, 7-ii, 7-iii and 7-iv show preferred netty structures used in the invention;

DETAILED DESCRIPTION OF THE INVENTION

The present invention relates to a catalyzer apparatus and method for the production thereof for holding particles of a catalyzer for purifying the exhaust gas discharged from an internal combustion engine, in which particles of the catalyzer can be protected against various external forces.

For the purposes of describing this invention, the expression "catalyzer" herein means a catalyst carrier or a catalyst carrier having the catalyst thereon or therein.

The present invention is now described with reference to the accompanying drawings.

Figure 1:
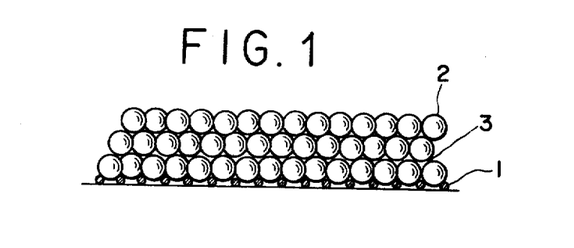
FIG. 1 is a side view showing particles of the catalyzer piled up on a netty structure.
Figure 2:
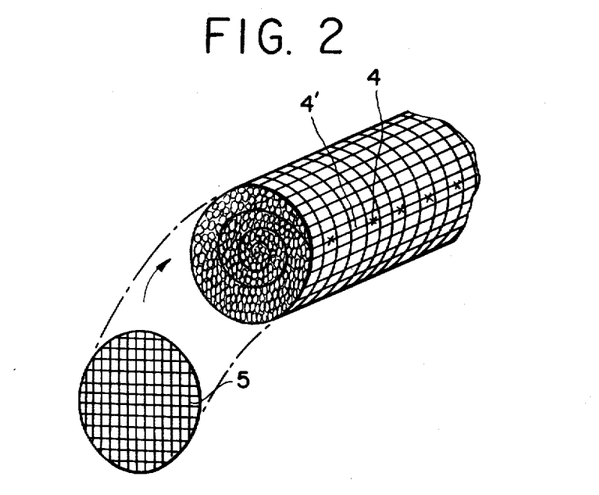
FIG. 2 is a perspective view of a block or roll formed according to the method of the invention.

As illustrated in FIG. 1, an appropriate netty structure 1 such as, for example, a wire screen or net is loaded with layers of catalyzer particles 2. The netty structure is then wound or rolled into a block or roll of suitable size, with the edges properly fastened as shown in FIG. 2. As also seen in this Figure, the cross-section of the block, when cut off perpendicular to its axis, may be in a spiral form.

The netty materials 1 used in the invention are heat and corrosion resistant wire screens or nets, or netty materials made of ceramic fiber or carbon fiber, or may be heat and corrosion resistant metal sheets with embossments and/or perforations to provide sufficient ruggedness to retain particles therein. It should be noted that wire nets made of nichrome wire may optionally be used as a medium to create heat by passing electricity therethrough. When a wire net is used, the wire is preferably of quite fine diameter to provide prompt warm-up characteristics, and the properties of the material of the wire will define the minimum diameter of the wire with respect to heat and corrosion resistance. The size of the mesh should be small enough to prevent the catalyzer particles 2 from dropping through the openings. Some reference examples of the materials and optimum diameters of the wire are reported in Table 1.

| Composition of crude material of wire net (percent by weight) | Coefficient of thermal (expansion $\times 10^{-6}/°C$) | Thermal conductivity (cal/cm/sec/ °C $\times 10^2$) | Optimum dia. of wire (mm) |
|---|---|---|---|
| Fe - 18 Cr - 8 Ni (JIS SUS 27) | 20.2 | 5.13(500°C) | 1 |
| Fe - 14 to 17 Cr - 33 to 37 Ni (JIS SUH 34) | 18.9 | 2.7(20°C) | 1.2 |
| Fe - 14 to 16 Cr - 1 to 3 | 12 – 14 | 4.9(20°C) | 0.8 |
| Fe - 19 to 21 Cr - 3 to 5 | 14 | 4.1(20°C) | 0.5 |
| Reference - A$_2$O$_3$ | 9 | 0.07(20°) 0.02(1000°C) | — |

Figure 5:
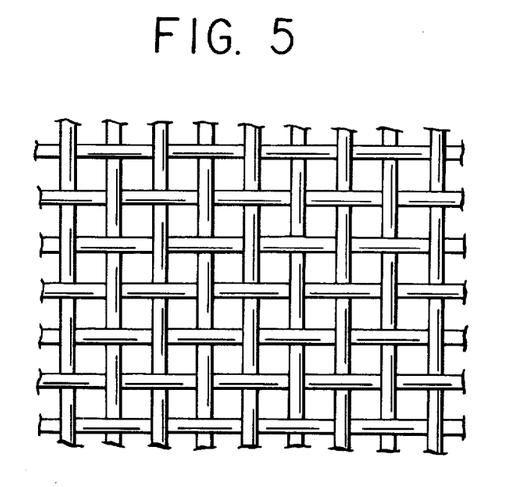
FIG. 5 shows preferred netty structure used in the invention.
Figure 6:
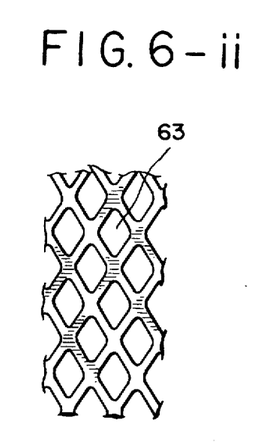
Figure 6I:
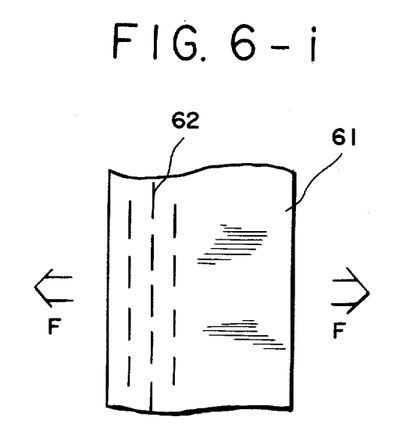
Figure 7:
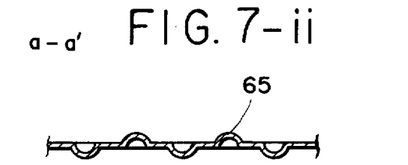
Figure 7I:
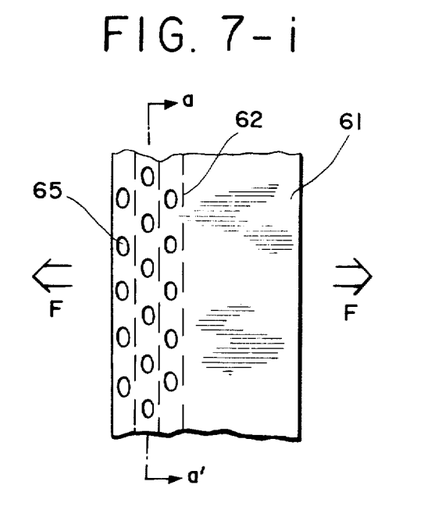

In the drawings, the netty materials used in the present invention include nets of the ordinary type as illustrated in FIG. 5. Metal sheets 61, as shown in FIG. 6 having the meshes 63, are created by expanding the sheets 61 in the direction of the arrow F as shown in FIG. 6-ii, after having created slits 62 therein as shown in FIG. 6-i. Metal sheets 61 as shown in FIG. 7 having openings 65 are created by expanding the sheet after having provided openings 65 of a suitable size between the slits 62 as shown in FIG. 7-i. Additional examples of such "ruggedness" are illustrated in FIGS. 7-ii, 7-iii and 7-iv, where the rough surfaces are obtained. The last example is useful in generating spring-type action.

Catalyzer particles 2, or granular catalyzers 2, may be in the form of spheres, sticks or cylinders and may be made of mechanically weak or fragile material such as a material principally comprising a ceramic.

As shown in FIG. 1, adhesives 3 may occasionally be used to closely stack the granular catalyzer 2 on the netty structure. Since these adhesives are applied for temporary adhesion, they should be substances which easily burn to ashes by heating them to less than about 200° to 300°C. In addition, their ash content after burning should not deteriorate the catalytic action of the catalysts used in the inventive system. These adhesives are preferably applied by spraying, although they may be applied by using a tacky film.

As described above herein, the gist of the invention lies in closely winding into a roll-like block the netty material 1 upon which is piled, as closely as possible, layers of the pellet catalyzer 2 and firmly fastening the edges of the roll as shown in FIG. 2. The edges 4 are fastened by brazing, arc welding or binding using a metal wire. Both sides of the roll-like block may then be firmly covered by caps 5 also formed of wire net.

Because the granular catalyzers are wound into a roll using netty structures or layers of the granular catalyzers are piled alternately with netty materials, the present invention makes it possible to utilize conventional catalyzers that are superior in catalytic action but are now not used because of their fragility. The roll-like block of the pellet catalyzer wound with netty materials and the block of layers of the pellet catalyzer piled alternately with netty structures is easy to handle because it can be manufactured to have an optional overall size suited to the apparatus in which this block is to be installed.

Furthermore, the roll of the netty materials makes it easy to pass the exhaust gas therethrough, and it acts as a cushion against shocks and vibrations so that the pellet catalyzers are maintained in their initial locations. Also, the roll functions to absorb expansion generated by heat so that the granular catalyzers, in use, will not break down.

In addition to the above-mentioned advantages, the following merits are inherent in the present invention.

1. There may be no mutual collisions of the pellet catalyzers caused by vibrations during operation of the internal combustion engine. Therefore, degradation of the catalyzers due to impact destruction may be completely prevented.

2. The inventive apparatus prevents compression of the pellet catalyzers against each other and against the inner wall of the converter, which may be caused by temperature changes such as quick heating or cooling of the converter. Therefore, degradation of the catalyzers due to such compression destruction may be prevented.

3. The inventive apparatus prevents rubbing of the granular catalyzers against one another and against the inner wall of the converter, which may be caused by flow of the exhaust gases. Therefore, degradation of the catalyzers due to such wear may be prevented.

4. The overall flow of the exhaust gas through the converter is controllable when a number of the inventive blocks are suitably arranged in the converter. The overall flow of the exhaust gas through the block may be gentle, and while some agitated flows may be created along the surface of each catalyzer, the surface of the catalyzers is thus effectively utilized.

5. The netty materials per se may be used as catalyzers.

6. The thermal capacity of the netty structures may be appropriately reduced by reducing the diameter of the wire thereof. Therefore, a good warm-up efficiency may be obtained.

7. The wire net may be utilized as a heat generating resistor. By passing an electric current through this wire net, its temperature may be raised thereby improving the purifying efficiency during the engine warm-up period.

Some preferred examples are given below.

EXAMPLE 1

Using wire net of 40 mesh made of about 1 mm diameter wire, (material JIS SUS27) and pellet ceramic catalyzers of about 3 mm center diameter, three layers of the catalyzers were piled up on the wire net, with adhesives of starch paste applied between the wire net and the individual pellet catalyzers, and between catalyzers themselves. FIG. 1 shows this first step embodying the method of the invention. The wire net thus stacked with the granular catalyzers was then wound into a roll-like block, as illustrated in FIG. 2, and both ends thereof were covered by caps made of wire net. The margin of the roll and the cap were fastened together by brazing. Thereafter, this block was heated to about 300°C. The adhesive was burned to ashes. This burning step should be conducted after mounting the block in a catalytic converter.

Figure 3:
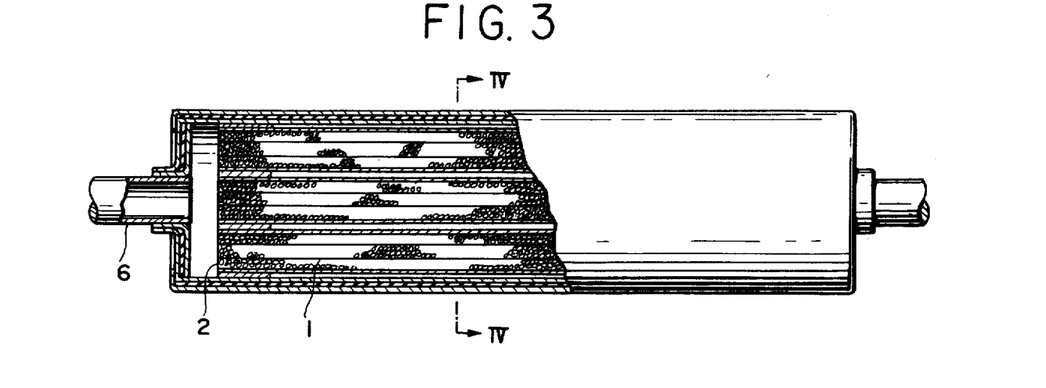
FIG. 3 is a longitudinal sectional view of a catalytic converter enclosing the catalyzer held according to the method of this invention.
Figure 4:
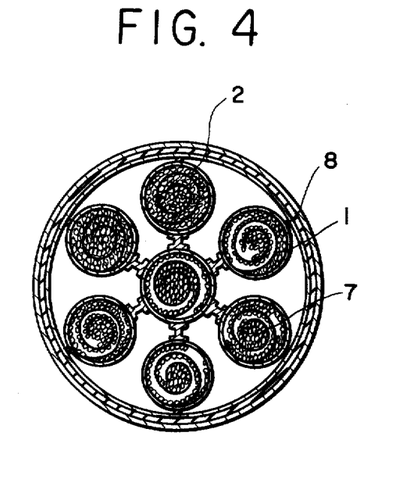
FIG. 4 is a cross-sectional view along the line IV—IV of the catalytic converter illustrated in FIG. 4.

As shown in FIG. 3, a longitudinal sectional view of a catalytic converter, and in FIG. 4, a cross-sectional view along the line IV—IV of the converter in FIG. 3, the blocks thus obtained were installed within a catalytic converter using supports to hold the blocks.

The result of experiments reports that these catalyzer blocks did not become broken when subjected to impacts of about 30G (G is the acceleration of gravity). Also, excellent catalytic action was observed by appropriately selecting the spacing between the blocks to adjust the flow of the exhaust gas therebetween.

EXAMPLE 2

Using a wire net similar to the one used in Example 1, a basket was prepared in the form of a roll. In this basket the pellet ceramic catalyzers of about 2–4 mm diameter were gradually packed, by shaking, as densely as possible. A block of the catalyzers was thus obtained.

In this case, the pellet catalyzers of different diameters may be densely packed. Also, the block obtained has a certain degrees of freedom such as flexibility because no adhesives are applied. Therefore, this block can be installed in the desired form in the catalytic converter. The strength of the block against impact was observed as similar to that of Example 1.

EXAMPLE 3

Using a wire net of 40 mesh made of Ni-Cr wire of about 0.2 mm dia., and pellet ceramic catalyzers of about 3 mm dia., a block in the form of a roll was produced according to Example 1. The portion 4 was fastened using Ni-Cr wire.

The experiments show that the block had a strength against impact similar to that of Example 1.

A brief explanation is here made concerning the desirability and effect of heating the wire net to a certain temperature for a short time after having started the engine.

The harmful substances in the exhaust gases such as, for example, CO and H.C are generally emitted in a large amounts during the period of about 30 to 40 seconds after starting the engine. In order to remove these harmful substances, the catalyst-charged bed should be heated during this period to reach active temperature of the catalyst. However, the bed will not reach, within 30 to 40 seconds, the minimum temperature (about 200° to 300°C) effective to activate the catalyst unless the bed is heated by some additional means.

In this example, the wire net itself can be heated by passing electric current through the wire net which is an electric resistant material. The passage of electric current is continued from engine starting until the catalyzer bed will reach the lowest effective temperature by the heat given from the exhaust gas. The electric power required for this heating may be provided from a battery with which most automotive vehicles are typically equipped. In the case of the Ni-Cr wire used herein, a wire net formed of 143 strings of about 0.2 mm diameter and about 50 cm length reaches the temperature of about 900°C after about 30 seconds passage of electric current from a common storage battery. Since a Ni-Cr alloy usually has a tendency to itself offer catalytic activity at such elevated temperatures, the heated wire net thus contributes to further purification of the exhaust gas during engine starting. The purifying ability of the engine during starting may additionally be increased by plating such catalytic elements as platinum or copper on the wire net of Ni-Cr wire.

EXAMPLE 4

Using a mesh having the same structure as shown in FIG. 5 made of ceramic fiber (about 45 – 51% of $Al_2O_3$ and about 52 – 47% of $SiO_2$), a block was produced in the form of a roll using similar procedures as described in Example 1.

Since this mesh structure is made of ceramic fiber, the same material as the catalyzers, there is no need to consider the differences in coefficient of thermal expansion between the mesh structure and the catalyzers, even when quick heating or cooling is involved. Consequently, the block may be installed in the catalytic converter without pre-arranged accomodations for preventing collapse of the catalyzers during use. In addition, the ceramic mesh structure typically is of lighter weight than similar metal structures, and still provides excellent warm-up efficiency. The mesh structure may be impregnated with the catalytic substances such as praseodymium or platinum, so that a synergistic effect for purification may be achieved by such catalytic substance and the pellet catalyzers held within the structure.

In place of ceramic fibers, glass fibers, carbon fibers, or any other suitable non-metallic fiber, may be used. For reference, the highest temperature at which ceramic fibers are typically used about 1,200°C and that for carbon fibers is about 200° to 300°C.

EXAMPLE 5

Figure 14:
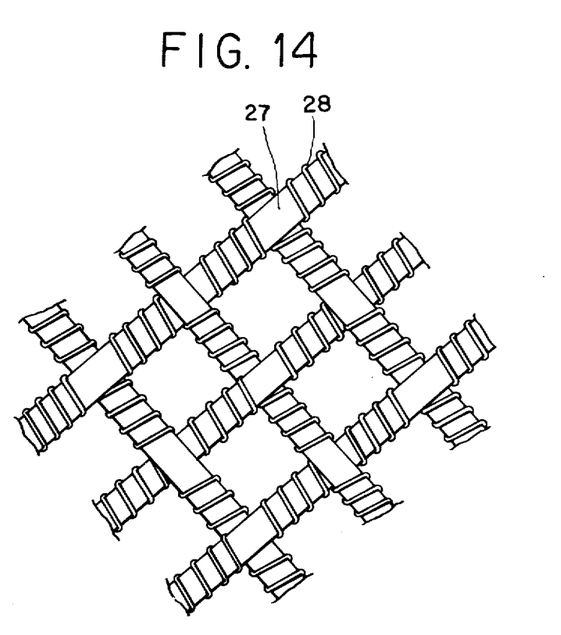
FIG. 14 is a front view showing a netty structure made of ceramic fiber, twisted with metal wire of fine diameter.

Metal wire 28 of fine diameter was twisted around the ceramic fiber 27 used in Example 4 to produce a netty structure as shown in FIG. 14. The netty structure was then formed into a roll-like block.

Metal wire having suitable electric resistance is used to generate heat by passage of electric current.

EXAMPLE 6

Figure 8:
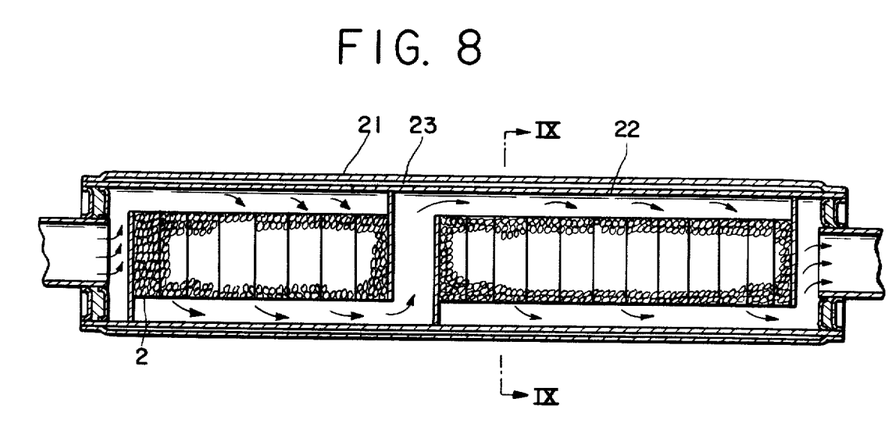
FIG. 8 is a longitudinal sectional view of another preferred embodiment of the catalytic converter of the present invention.
Figure 9:
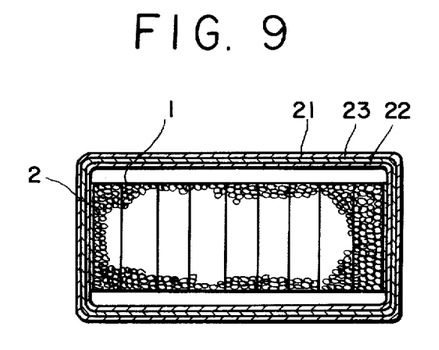
FIG. 9 is a cross-sectional view along line IX—IX of FIG. 8.

The block in the form of a roll produced according to the invention was installed in a down-flow type converter. This embodiment is shown in FIGS. 8 and 9. FIG. 8 is a longitudinal sectional view of the converter and FIG. 9 is a cross-sectional view along the line IX—IX of the converter in FIG. 8, in which netty structures are indicated at 1, pellet catalyzers at 2, the outer and inner walls of the converter at 21 and 22, and heat insulator at 23.

EXAMPLE 7

Figure 10:
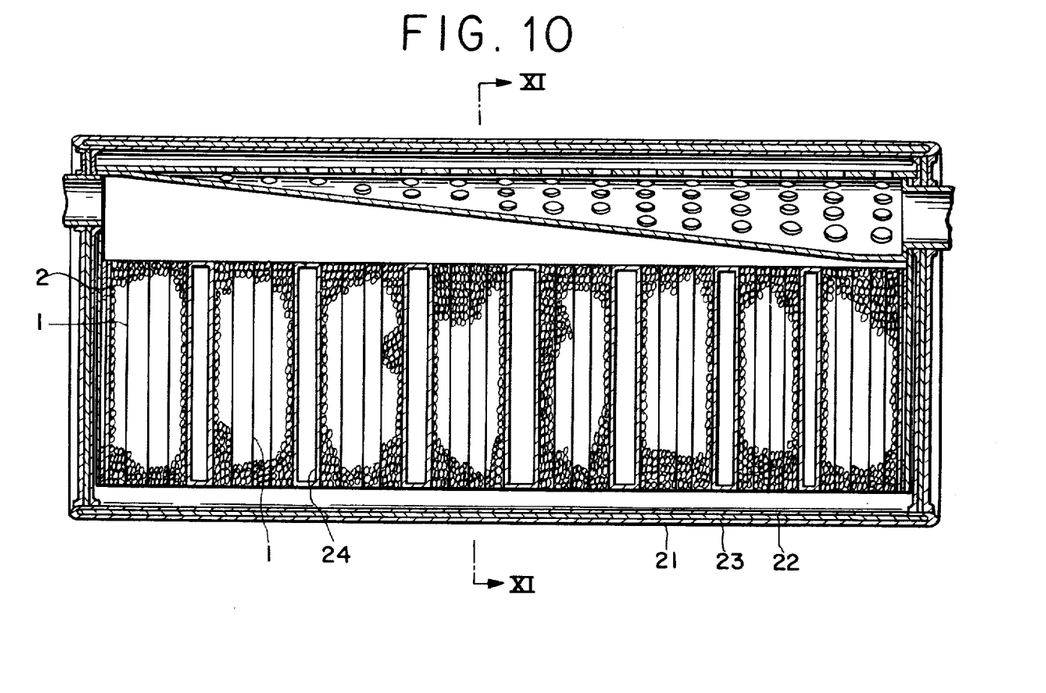
FIG. 10 is a longitudinal sectional view of another preferred embodiment of the catalytic converter of this invention.
Figure 11:
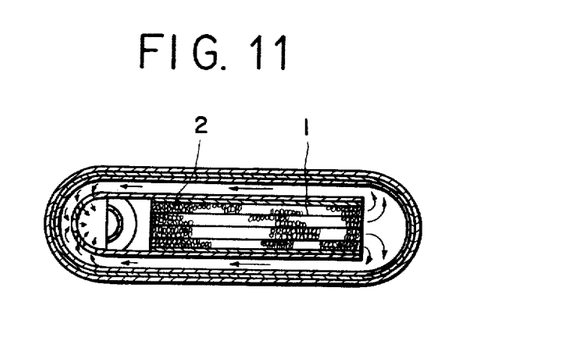
FIG. 11 is a cross-sectional view along line XI—XI of FIG. 10.

The block in the form of a roll produced according to the invention was installed in a horizontal-type converter. This embodiment is shown in FIGS. 10 and 11. FIG. 10 is a longitudinal sectional view of the converter of this type and FIG. 11 is a cross-sectional view along the line XI—XI of the converter in FIG. 10, in which 24 indicates a support for a block and other numerals have the same meansings as given above.

EXAMPLE 8

Figure 12:
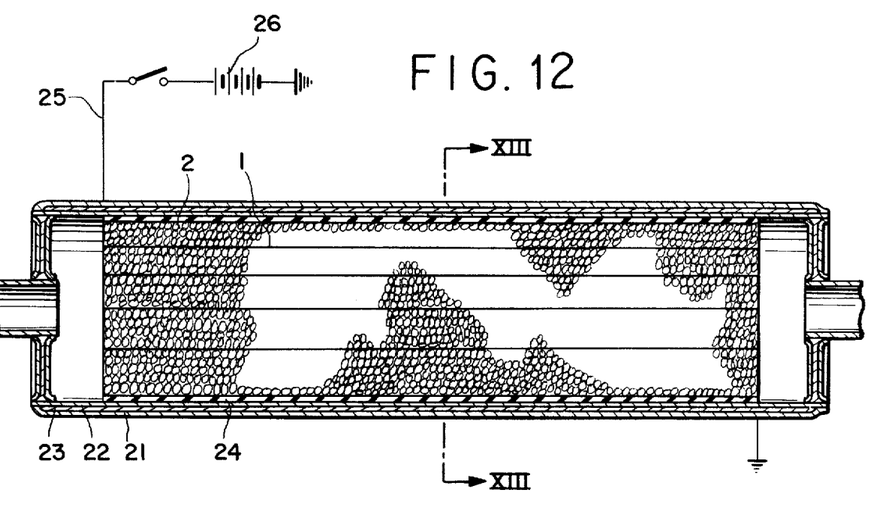
FIG. 12 is a longitudinal sectional view of still another preferred embodiment of the catalytic converter of this invention.
Figure 13:
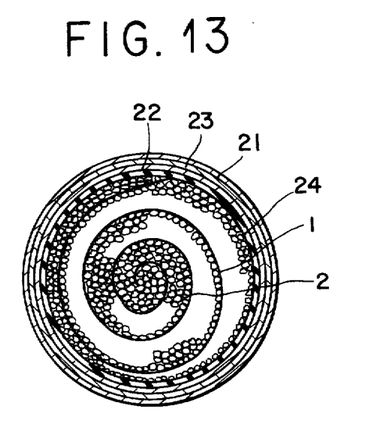
FIG. 13 is a cross-sectional view along line XIII—XIII in FIG. 12.

This embodiment shows a single-type converter, as in FIGS. 12 and 13. FIG. 12 is a longitudinal sectional view and FIG. 13 is a cross-sectional view along the line XII—XII, in which a wire is indicated at 25, an electric power source at 26 and other elements at the corresponding numerals as given above.

What is claimed is:

1. A catalyzer apparatus, in which pellet catalyzers are held between closely seated layers of a heat-resistant net-like material which is wound into a roll like block and both ends of said block are capped by a heat resistant net-like material.

2. An apparatus as claimed in claim 1, in which pellet catalyzers are closely seated in the spaces formed between heat-resistant net-like materials, said netty materials being wound into a block in a manner that the cross section of said block, when cut off perpendicularly to its axis, may be a spiral form.

3. An apparatus as claimed in claim 1, in which the pellet catalyzers consist of catalysts for purifying exhaust gas of an internal combustion engine.

4. An apparatus as claimed in claim 1, in which said heat-resistant net-like materials are selected from the group consisting of wire net, ceramic fiber net, glass fiber net, carbon fiber net, a thin metallic plate with an irregular surface and a considerable elasticity and a thin metallic plate with rough surfaces.

5. An apparatus as claimed in claim 1, in which said net-like material comprises ceramic fibers.

6. An apparatus as claimed in claim 1, in which said net-like material comprises a material selected from the group consisting of carbon fibers and glass fibers.

7. An apparatus as claimed in claim 1, in which said net-like material comprises a material with high electric resistance and conductibility.

8. An apparatus as claimed in claim 1, in which said net-like material comprises a fiber selected from the group consisting of ceramic fiber, carbon fiber and glass fiber and holds pellet catalyzers selected from the group consisting of platinum and copper.

9. An apparatus as claimed in claim 1, in which said net-like material comprises a Ni-Cr alloy plated with a material selected from the group consisting of: platinum and copper.

10. An apparatus as claimed in claim 1, in which said net-like material is made of a heat-resistant and corrosion-resistant substance.

11. A method for producing a catalyzer apparatus which comprises forming layers of pellet catalyzers on heat resistant net-like materials, winding said layers into a roll like block and capping both ends of said block with a heat resistant net-like material thereby closely sealing said pellet catalyzers between said net-like materials.

12. A method as claimed in claim 11, which comprises piling pellet catalyzers on net-like materials, said net-like materials being wound into a block in such a manner that the cross section of said block, when cut off perpendicularly to its axis, may be a spiral form, and the both ends of said block are capped with wire net.

13. A method as claimed in claim 11, which comprises using an adhesive, which can burn, to pile pellet catalyzers on netty material.

14. A method as claimed in claim 11, which comprises using pellet catalyzers consisting of catalysts for purifying the exhaust gas of an internal combustion engine.

15. A method as claimed in claim 11, which comprises using a heat-resistant net-like material selected from the group consisting of wire net, ceramic fiber net, glass fiber net, carbon fiber net, a thin metallic plate with an irregular surface and a considerable elasticity and a thin metallic plate with rough surfaces.

16. A method as claimed in claim 11, in which said net-like material comprises ceramic fibers.

17. A method as claimed in claim 11, in which said net-like material comprises a material from the group consisting of cargon fibers and glass fibers.

18. A method as claimed in claim 11, in which said net-like material comprises a material with high electric resistance and conductibility.

19. A method as claimed in claim 11, in which said net-like material comprises a fiber selected from the group consisting of ceramic fiber, carbon fiber and glass fiber and holds pellet catalyzers selected from the group consisting of platinum and copper.

20. A method as claimed in claim 11, in which said netty material comprises a Ni-Cr alloy plated with a material selected from the group consisting of: platinum and copper.

21. A method as claimed in claim 11, in which said net-like material is made of a heat-resistant and corrosion-resistant substance.

* * * * *